US007926959B1

(12) United States Patent  
Kvamme et al.

(10) Patent No.: US 7,926,959 B1  
(45) Date of Patent: Apr. 19, 2011

(54) BEAM CONDITIONING TO REDUCE SPATIAL COHERENCE

(75) Inventors: Damon Kvamme, Los Gatos, CA (US); David Alles, Los Altos, CA (US); Chun Lee, Cupertino, CA (US); Wu Jiang, Sunnyvale, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 552 days.

(21) Appl. No.: 12/060,050

(22) Filed: Mar. 31, 2008

(51) Int. Cl.  
*G02B 5/122* (2006.01)

(52) U.S. Cl. ...................................................... 359/529

(58) Field of Classification Search .................. 359/529, 359/530  
See application file for complete search history.

(56) References Cited

U.S. PATENT DOCUMENTS 7,045,278 B2 * 5/2006 Ihara et al. ..................... 359/530  
2002/0154408 A1 * 10/2002 Minoura et al. ............... 359/529  
* cited by examiner

*Primary Examiner* — Euncha P Cherry  
(74) *Attorney, Agent, or Firm* — Luedeka, Neely & Graham, P.C.

(57) ABSTRACT

Methods and apparatus relating to electromagnetic beam (e.g., laser beam) conditioning are described. In an embodiment, electromagnetic beam conditioning may be performed utilizing reflectors to temporally differentiate electromagnetic beam subsections and sub-beams resulting in reduced spatial coherence of the beam. Other embodiments are also described.

24 Claims, 4 Drawing Sheets

Corner Cube Reflector
202

BEAM CONDITIONING TO REDUCE SPATIAL COHERENCE

FIELD

The subject matter described herein generally relates to electromagnetic beam conditioning. In one embodiment, some of the techniques described herein may be utilized to reduce the spatial coherence of an electromagnetic beam.

BACKGROUND

When manufacturing integrated circuit (IC) devices, a laser beam may be used during the manufacturing process to inspect media used in IC fabrication for defects. Generally, a laser beam is a highly coherent beam of radiation. Laser beams may be used to generate an image of the media under inspection. An object with a rough surface (e.g., media used in IC fabrication), when illuminated by a laser beam, may exhibit a speckled appearance. This speckled appearance may cause the media image to appear noisy and distorted. Hence, the presence of speckle in the inspection image may result in an ineffective inspection process. To this end, reducing the amount of speckle encountered in the inspection process may be essential to the effectiveness of the inspection process.

SUMMARY

In accordance with some embodiments, techniques for conditioning an electromagnetic beam (such as a laser beam) are described. In an embodiment, electromagnetic beam conditioning may be performed to reduce the spatial coherence of an electromagnetic beam.

In one embodiment, an apparatus may include a plurality of plane reflectors to temporally differentiate X-directed subsections of an electromagnetic beam (e.g., a continuous wave laser beam or a pulse laser beam). Additionally, the apparatus may include a second set of reflectors to temporally differentiate Y-directed subsections resulting in an output beam comprising a plurality (e.g., columns and rows) of temporally differentiated sub-beams.

In one embodiment, an apparatus may include a plurality of corner cube reflectors to temporally differentiate column subsections of an electromagnetic beam (e.g., a continuous wave laser beam or a pulse laser beam). Additionally, the apparatus may include right angle reflectors to temporally differentiate row sub-beams of the subsections resulting in an output beam comprising a plurality (e.g., columns and rows) of temporally differentiated sub-beams.

In another embodiment, a method may reflect an electromagnetic beam off of a plurality of corner cube reflectors and right-angle reflectors (or plane mirrors) to temporally differentiate sub-beams of the electromagnetic beam. Additionally, the electromagnetic beam may be reflected off of the plurality of corner cube reflectors and right-angle reflectors to generate a plurality of sub-beams of unequal sizes.

Additional advantages, objects, and features of embodiments of the invention are set forth in part in the detailed description which follows. It is to be understood that both the foregoing general description and the following detailed description are merely exemplary of embodiments of the invention, and are merely intended to provide an overview or framework for understanding the nature and character of embodiments of the invention.

BRIEF DESCRIPTION OF THE DRAWINGS

The accompanying drawings are included to provide further understanding of embodiments of the invention, illustrate various embodiments of the invention, and together with the description serve to explain the principles and operation of the invention. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of embodiments of the invention. Embodiments of the invention may be practiced without some or all of these specific details. In other instances, well known process operations have not been described in detail in order not to unnecessarily obscure embodiments of the invention.

Also, reference in the specification to "one embodiment" or "an embodiment" means that a particular feature, structure, or characteristic described in connection with the embodiment is included in at least an implementation. The appearances of the phrase "in one embodiment" in various places in the specification may or may not be referring to the same embodiment.

Figure 1:
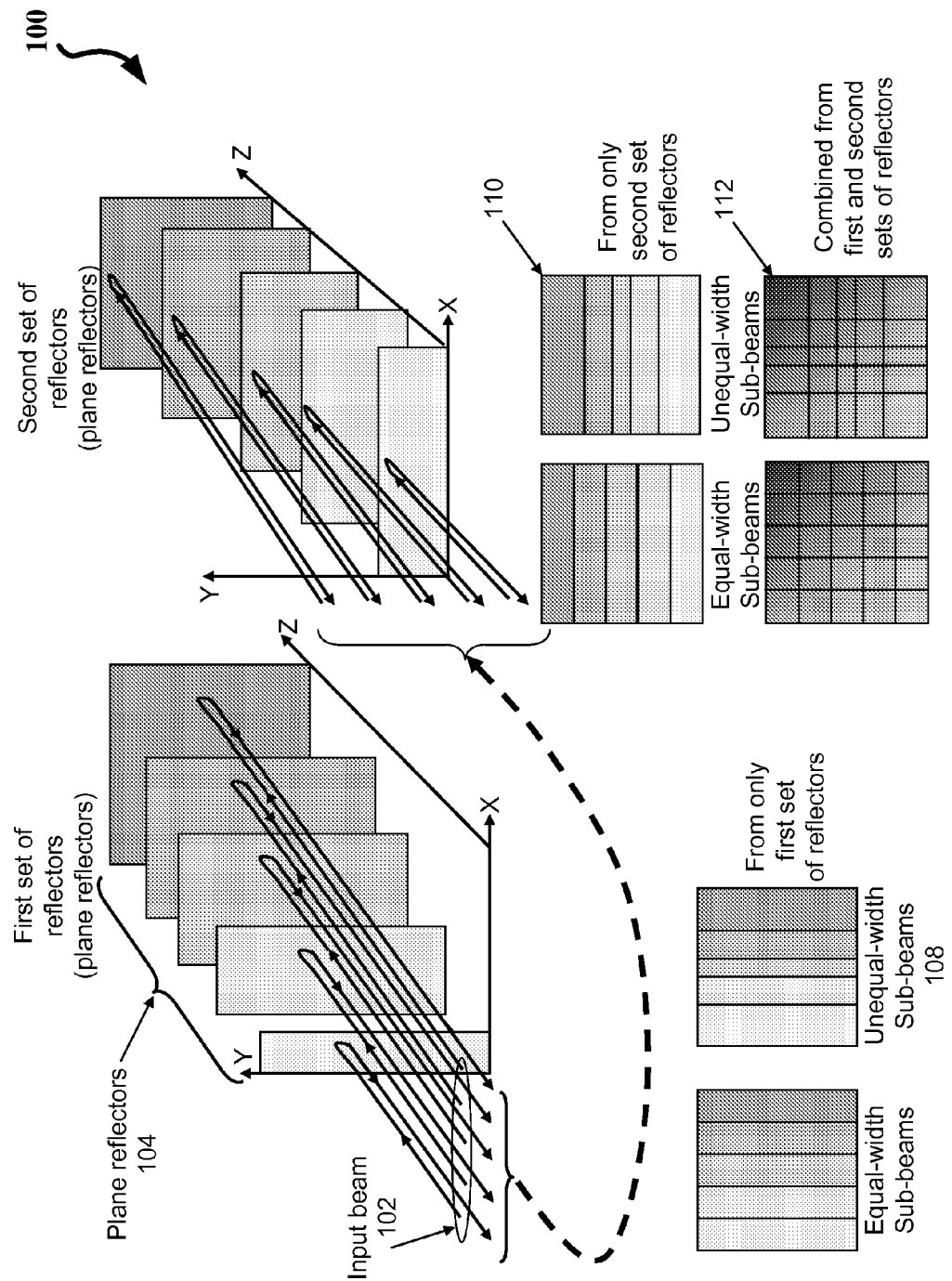
FIG. 1 illustrates a diagram of an electromagnetic beam conditioning system, according to an embodiment employing plane reflectors.

FIG. 1 illustrates a diagram of an electromagnetic beam conditioning system 100 in accordance with an embodiment of the invention. In various embodiments, the system 100 may be used to condition an electromagnetic beam (which may be also referred to herein more as a "beam", "laser" or "laser beam") in order to reduce spatial coherence, such as discussed further herein with reference to FIGS. 1-4, for example.

As shown in FIG. 1, the system 100 may include a plurality of plane reflectors 104 to reflect a plurality of subsections of the electromagnetic input beam 102. The plurality of plane reflectors 104 may be spaced along a first axis of the electromagnetic beam 102 such that each plane reflector 104 may reflect a subsection of the beam. For example, the plane reflectors 104 may be arranged to reflect vertical slices (parallel to the y-axis) of the electromagnetic beam 102 side by side but at different depths along the z-axis so that each plane reflector 104 reflects a subsection or vertical slice of the electromagnetic beam 102 so as to delay each subsection with respect to the other subsections. In another embodiment, the system 100 may include a plurality of corner cube reflectors 202 in place of the plane reflectors where the corner cube reflectors may be hollow corner cube reflectors. For example, a hollow corner cube reflector may be viewed as a corner that has been cut out of a box where each of the three sides of the box at the corner may be flat reflectors. More specifically, a hollow corner cube reflector may have three mutually perpendicular surfaces and a hollow center. In another embodiment, the system 100 may include a plurality of corner cube reflectors 202 where the corner cube reflectors may be solid corner cube reflectors. For example, a solid corner cube reflectors may have the same properties as a hollow corner cube reflector but may be a solid prism instead of a hollow reflector. More specifically, a solid corner cube reflector may be a prism with three mutually perpendicular surfaces and a hypotenuse face. In yet another embodiment, the system 100 may include a plurality right-angle reflectors 304 where the flat reflectors are replaced by right-angle reflectors.

The system 100 may additionally include a plurality of reflectors (right angle prisms, corner cubes or flat mirrors) 106 to reflect a plurality of sub-beams (horizontal slices) of each of the plurality of subsections. The plurality of plane reflectors 106 may be spaced along a second axis of the electromagnetic beam 102 such that each plane reflector 106 may reflect its sub-beam delaying this sub-beam relative to the other sub-beams. For example, the plane reflectors 106 may be arranged along the Y-axis to reflect a horizontal slice of the electromagnetic beam 102 top to bottom but at different depths along the z-axis of the electromagnetic beam such that each plane reflector's reflected horizontal slice of the electromagnetic beam is delayed by a different amount with respect to all the other rows. In an embodiment, the system 100 may include plane reflectors, corner cube reflectors or right-angle reflectors 106 and plane reflectors, corner cube reflectors or corner cube reflectors 104 in any combination. For example, the reflectors may be positioned such that the electromagnetic beam 102 reflects off of the right-angle reflectors 106 first and the corner cube reflectors 104 second. In another embodiment, the system 100 may include right-angle reflectors 106 and corner cube reflectors 104 that may be positioned such that the electromagnetic beam 102 reflects off of the corner cube reflectors 104 first and the right angle reflectors 106 second. In another embodiment, the system 100 may include corner cube reflectors 104 and right angle reflectors 106 that may be spaced to produce plurality of sub-beams of unequal size 108, 110, 112. For example, the plurality of sub-beams may be collectively viewed as a grid (e.g., columns and rows) of individual beams where each beam in the grid may be of a different size and shape than the other beams in the grid in order to produce sub-beams of uniform power, such as discussed with reference to FIG. 4. In another embodiment, the system 100 may include a beam generator to generate an electromagnetic beam.

Figure 2:
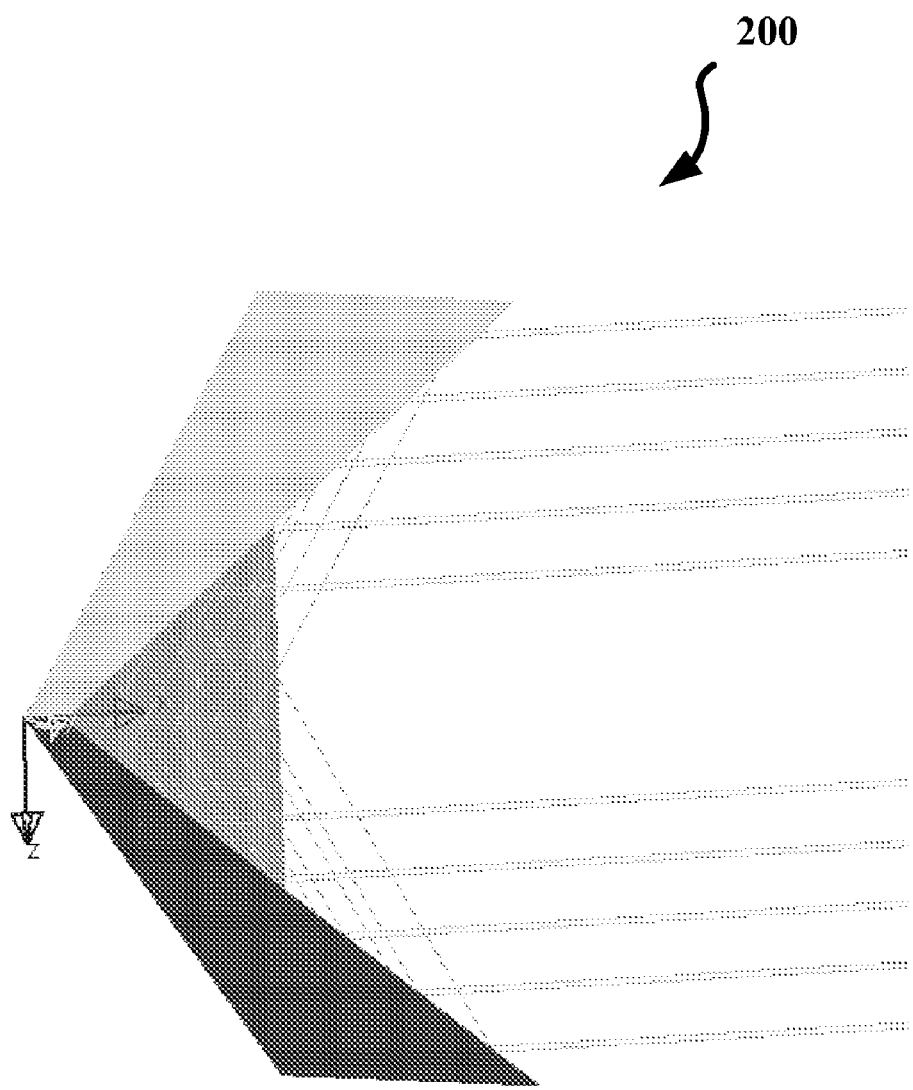
FIG. 2 illustrates a corner cube reflector that may be utilized in various embodiments of the invention.

FIG. 2 is an illustration of a corner cube reflector 200, according to an embodiment. In one embodiment, the reflector of FIG. 2 may be a component discussed with reference to FIGS. 1 and 4. In an embodiment, the corner cube reflector 200 may be made from three flat mirrors so that the reflections occur at the surfaces or it may alternatively be made from a solid piece of material with the reflections occurring due to total internal reflection. A corner cube reflector 202 may be a reflector with three mutually perpendicular surfaces and a hypotenuse face. The nature of the reflector may be such that a beam entering the corner cube reflector is reflected off of the three perpendicular surfaces of the corner cube reflector and is reflected back along a path parallel to the path that the beam took to enter the corner cube reflector.

Figure 3:
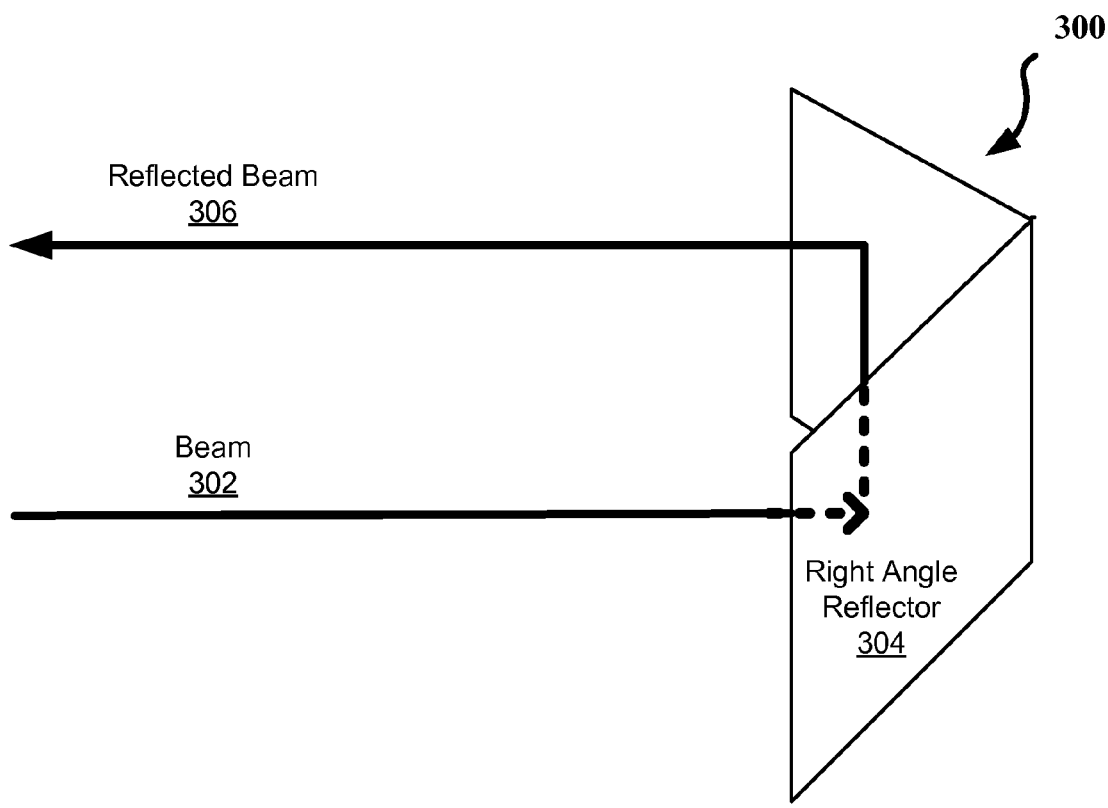
FIG. 3 illustrates a right-angle reflector that may be utilized in various embodiments of the invention.

FIG. 3 is an illustration of a right-angle reflector 300, according to an embodiment. In one embodiment, the reflector of FIG. 3 may be a component discussed with reference to FIGS. 1 and 4. As shown in FIG. 3, a beam 302 may be reflected by a right angle reflector 304 to generate a reflected beam 306.

Figure 4:
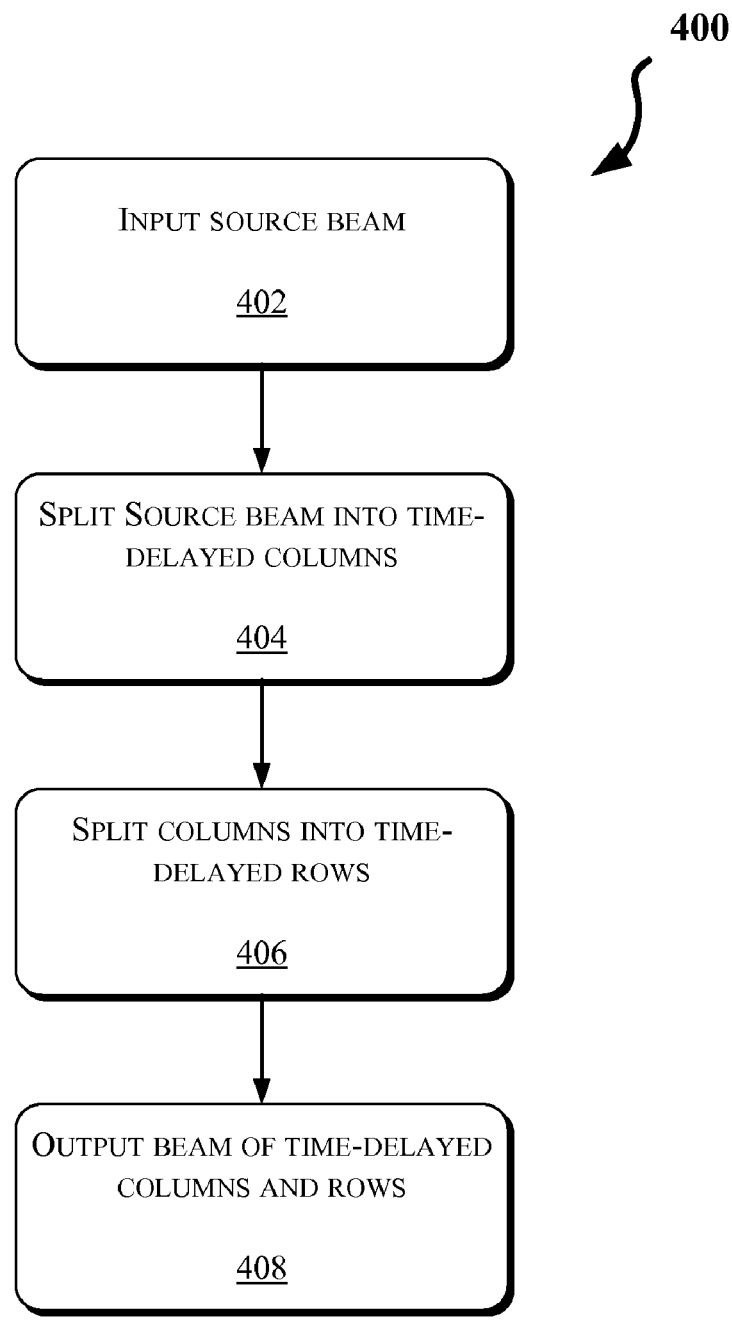
FIG. 4 is a flow diagram of a method to condition an electromagnetic beam to reduce spatial coherence, according to an embodiment.

FIG. 4 illustrates a flow diagram of a method 400 to condition an electromagnetic beam to reduce spatial coherence. In one embodiment, various operations discussed with reference to FIG. 4 may be performed by some of the components discussed with reference to FIGS. 1, 2, and 3.

Referring to FIGS. 1-4, at an operation 402, a source beam (e.g., an electromagnetic beam) is input (e.g., directed to a plurality of reflectors). At an operation 404, the electromagnetic beam may be reflected off of the plurality of column reflectors spaced along a first axis (x-axis) to separate the electromagnetic beam into subsections. The column reflectors may also be spaced along the beam's direction of travel thereby creating temporally differentiated beam subsections. For example, given five reflectors the electromagnetic beam may be split along the x-axis to create five individual columns. Furthermore, because each of theses columns may be reflected by reflectors at different Z positions along the beam path each reflection may be separated in time with respect to the others. The time delay may be a function of the Z spacings of the reflector and the speed of light (which is about 1 ns per foot). Spacing the reflectors along the z-axis of the electromagnetic beam creates five columns separated by few nanoseconds time from the adjacent column.

In an embodiment, the column reflectors may be spaced non-equidistant from each other along the first axis (X-axis) creatin unevenly sized subsections 108 thereby compensating for the low intensity of the beam along the outer edge of a nonuniform electromagnetic beam.

Referring to FIGS. 1-4, at an operation 406, the electromagnetic beam is reflected off of the plurality of row reflectors spaced along a second axis (y-axis) creating sub-beams from each of the row reflectors. The row reflectors are spaced along the beam's direction of travel thereby creating temporally differentiated sub-beams from each of the row reflectors. For example, given five reflectors the electromagnetic beam may be split along the y-axis to create five individual rows. By appropriately spacing the reflectors along the z-axis of the beam each reflection may be delayed by a time proportional to the separation of the mirrors and the speed of light. In an embodiment, the row reflectors may be spaced non-equidistant from each other along the second (Y-axis) axis creating unevenly sized sub-beams 110 thereby compensating for the low power of the beam along the outer edge of the electromagnetic beam.

Referring to FIGS. 1-4, at an operation 408, the subsections generated at the operation 404 and the sub-beams generated at the operation 406 may generate a plurality of temporally differentiated sub-beams. For example, the plurality of sub-beams may be viewed as a grid (e.g., columns and rows) of individual sub-beams where each sub-beam represents a portion of the original electromagnetic beam 111. Furthermore, each sub-beam may be delayed from other sub-beams in time (e.g., the sub-beam may be delayed relative to the sub-beam next to it). Additionally, the grid may comprise M columns and N rows of sub-beams where the delay between each column of sub-beams may be N coherence lengths and the delay between each row of sub-beams may be one coherence length. The coherence length may be the difference in propagation distance of two sub-beams from a coherent source (e.g., the electromagnetic beam) where the interference, as a function of Z between the two sub-beams is reduced by a specified degree.

In some embodiments, at operation 408, the subsections generated at the operation 404 and the sub-beams generated at the operation 406 may generate a plurality of temporally differentiated sub-beams of unequal cross-sectional areas 112. For example, in order to maximize the light throughput, the electromagnetic beam (which may have a Gaussian intensity distribution) may not uniformly illuminate the input aperture of the beam conditioner. One drawback may be that the parts of the beam that have low power (integrated intensity) may not contribute the same to the speckle reduction as those from the areas of high power. To obtain relatively even contributions, the input beam could be specified to have a flat intensity profile. This may be accomplished by expanding the beam so that the middle of the Gaussian beam is used. This may however reduce the efficiency of the module. Instead, the grid of M columns and N rows may have a non-uniform spacing. Sub-beams farther from the center may have larger cross-sectional areas and therefore may contain more light than they would if the grid were uniform. This may make each X/Y sub-beam have equal power and thus an equal contribution to the speckle reduction.

Although embodiments have been described in language specific to structural features and/or methodological acts, it is to be understood that claimed subject matter may not be limited to the specific features or acts described. Rather, the specific features and acts are disclosed as sample forms of implementing various embodiments. While the invention has been described above in conjunction with one or more specific embodiments, it should be understood that the invention is not intended to be limited to one embodiment. The invention is intended to cover alternatives, modifications, and equivalents as may be included within the spirit and scope of the invention, such as those defined by the appended claims.

The invention claimed is:

1. An apparatus comprising:
a plurality of N column reflectors to receive and reflect an input electromagnetic beam having temporal coherence, wherein the plurality of column reflectors are positioned along a first axis of the electromagnetic beam and at different depths along a path of the input electromagnetic beam, such that each reflector is to reflect different subsections of the electromagnetic beam and temporally differentiate each of the subsections from other subsections of the electromagnetic beam; and
a plurality of M row reflectors to reflect the subsections of the input electromagnetic beam, wherein the plurality of row reflectors are positioned along a second axis of the input electromagnetic beam and at different depths along the path of the input electromagnetic beam, such that each reflector is to reflect different sub-beams of each of the subsections and temporally differentiate each of the sub-beams from other sub-beams of other subsections of the input electromagnetic beam;
wherein the plurality of row reflectors and the plurality of column reflectors are to generate an output electromagnetic beam having temporal incoherence and comprising an N by M grid of the sub-beams such that each of the sub-beams is temporally differentiated from all of the other sub-beams.

2. The apparatus of claim 1, further comprising an electromagnetic beam generator to generate the electromagnetic beam.

3. The apparatus of claim 1, wherein each of the plurality of column reflectors comprises a hollow corner cube reflector.

4. The apparatus of claim 1, wherein each of the plurality of column reflectors comprises a solid corner cube reflector.

5. The apparatus of claim 1, wherein each of the plurality of column reflectors comprises a hollow right angle reflector.

6. The apparatus of claim 1, wherein each of the plurality of column reflectors comprises a solid right angle reflector.

7. The apparatus of claim 1, wherein each of the plurality of column reflectors comprises a flat reflector.

8. The apparatus of claim 1, wherein each of the plurality of row reflectors comprises a hollow corner cube reflector.

9. The apparatus of claim 1, wherein each of the plurality of row reflectors comprises a solid corner cube reflector.

10. The apparatus of claim 1, wherein each of the plurality of row reflectors comprises a hollow right-angle reflector.

11. The apparatus of claim 1, wherein each of the plurality of row reflectors comprises a solid right-angle reflector.

12. The apparatus of claim 1, wherein each of the plurality of row reflectors comprises a flat reflector.

13. The apparatus of claim 1, wherein each of the plurality of column reflectors is spaced non-equidistant from other column reflectors to generate the electromagnetic sub-beams each having unequal size.

14. The apparatus of claim 1, wherein each of the plurality of row reflectors is offset non-equidistant from other row reflectors to generate the electromagnetic beam subsections each having unequal size.

15. The apparatus of claim 1, wherein each of the plurality of column reflectors and each of the plurality of row reflectors is spaced to generate the electromagnetic sub-beams such that the sub-beams corresponding to the outer edges of the electromagnetic beam are larger than the sub-beams corresponding to the center of the electromagnetic beam to compensate for the reduced beam strength on the outer edges of the electromagnetic beam.

16. A method comprising:
reflecting an input electromagnetic beam having temporal coherence off of a plurality of N column reflectors disposed at different depths along a path of the input electromagnetic beam to produce N electromagnetic beam subsections temporally differentiated along a first axis; and
reflecting the electromagnetic beam subsections off of a plurality of M row reflectors disposed at different depths along a path of the electromagnetic beam subsections to produce M electromagnetic sub-beams of each of the plurality of electromagnetic beam subsections temporally differentiated along a second axis;
thereby producing an output electromagnetic beam having temporal incoherence and comprising an N by M grid of the sub-beams such that each of the sub-beams is temporally differentiated from all other sub-beams.

17. The method of claim 16, wherein reflecting the electromagnetic beam off of the plurality of row reflectors comprises generating a plurality sub-beams each having unequal size.

18. The method of claim 16, wherein reflecting the electromagnetic beam off of the plurality of column reflectors comprises generating the plurality of electromagnetic beam subsections each having unequal size.

19. The method of claim 16, wherein reflecting the electromagnetic beam off of the plurality of column reflectors and row reflectors comprises generating the plurality of electromagnetic sub-beams such that the sub-beams corresponding to the outer edges of the electromagnetic beam are larger than the sub-beams corresponding to the center of the electromagnetic beam to compensate for the reduced beam strength on the outer edges of the electromagnetic beam.

20. The method of claim 16, wherein reflecting the electromagnetic beam off each of a plurality of column reflectors comprises reflecting the electromagnetic beam off of at least one of a hollow corner cube reflector, a solid corner cube reflector, a hollow right angle reflector, a solid right angle reflector, and a flat reflector.

21. A system for conditioning a laser beam to reduce spatial coherence, the system comprising:
a plurality of N corner cube reflectors disposed at different depths along a path of the laser beam to reflect and temporally differentiate a plurality of laser beam subsections of the laser beam along a first axis of the laser beam;
a plurality of M right-angle reflectors disposed at different depths along a path of the subsections of the laser beam, to reflect and temporally differentiate a plurality of laser sub-beams from of each of the plurality of laser beam subsections along a second axis of the laser beam;

thereby producing an output laser beam having temporal incoherence and comprising an N by M grid of the sub-beams; and an electromagnetic beam generator to generate the laser beam, wherein each of the plurality of laser sub-beams is temporally differentiated from all other laser sub-beams.

22. The system of claim 21, wherein each of the plurality of right angle reflectors is offset non-equidistant from other right angle reflectors to generate the laser sub-beams each having unequal size.

23. The system of claim 21, wherein each of the plurality of corner cube reflectors is offset non-equidistant from other corner cube reflectors to generate the laser beam subsections each having unequal size.

24. The system of claim 21, wherein each of the plurality of corner cube reflectors and each of the plurality of right angle reflectors is spaced to generate the laser sub-beams such that the sub-beams corresponding to the outer edges of the laser beam are larger than the sub-beams corresponding to the center of the laser beam to compensate for the reduced beam strength on the outer edges of the laser beam.

* * * * *

UNITED STATES PATENT AND TRADEMARK OFFICE
Certificate

Patent No. 7,926,959 B1                                                                                                     Patented: April 19, 2011

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Damon Kvamme, Los Gatos, CA (US); David Alles, Los Altos, CA (US); Chun Lee, Cupertino, CA (US); Wu Jiang, Sunnyvale, CA (US); and Paul Zorabedian, Mountain View, CA (US).

Signed and Sealed this Fourteenth Day of August 2012.

*STEPHONE ALLEN*
*Supervisory Patent Examiner*
Art Unit 2872
Technology Center 2800